(12) United States Patent
Kim

(10) Patent No.: US 7,595,661 B2
(45) Date of Patent: Sep. 29, 2009

(54) LOW VOLTAGE DIFFERENTIAL SIGNALING DRIVERS INCLUDING BRANCHES WITH SERIES RESISTORS

(75) Inventor: Jin-hyun Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 632 days.

(21) Appl. No.: 11/295,353

(22) Filed: Dec. 6, 2005

(65) Prior Publication Data
US 2006/0132179 A1 Jun. 22, 2006

(30) Foreign Application Priority Data
Dec. 17, 2004 (KR) .................. 10-2004-0107994

(51) Int. Cl.
*H03K 19/0175* (2006.01)
*H03B 1/00* (2006.01)
*H03K 3/00* (2006.01)

(52) U.S. Cl. .................... 326/82; 327/108; 327/563

(58) Field of Classification Search ............. 326/68, 326/82, 83, 86, 112, 115, 119; 327/333
See application file for complete search history.

(56) References Cited

U.S. PATENT DOCUMENTS

| 5,977,796 | A | 11/1999 | Gabara |
| 6,025,742 | A * | 2/2000 | Chan ............. 327/108 |
| 6,114,898 | A | 9/2000 | Okayasu |
| 6,448,815 | B1 | 9/2002 | Talbot et al. |
| 6,720,805 | B1 * | 4/2004 | Haas ............. 327/108 |
| 7,113,002 | B2 * | 9/2006 | Otsuka et al. ........ 326/86 |
| 7,400,170 | B2 * | 7/2008 | Bitting .............. 326/82 |
| 2005/0239431 | A1 | 10/2005 | Yamamoto et al. |

FOREIGN PATENT DOCUMENTS

JP 2000-59443 A 2/2000
JP 2004-146403 A 5/2004

OTHER PUBLICATIONS

Notice to Submit Response, Korean App. No. 10-2004-0107994, May 26, 2006 (with English language translation).

* cited by examiner

*Primary Examiner*—Rexford N Barnie
*Assistant Examiner*—Dylan White
(74) *Attorney, Agent, or Firm*—Myers Bigel Sibley & Sajovec, P.A.

(57) ABSTRACT

A low voltage differential signal driver includes first and second current sources, a first branch and a second branch. The first branch includes at least two transistors and at least two resistors between them that are all connected in series between the first and second current sources, to define a first node between adjacent resistors that is configured to transmit and receive differential signals. The second branch also includes at least two transistors and at least two resistors between them that also are all connected in series between the first and second current sources, to define a second node between adjacent resistors that is also configured to transmit and receive differential signals.

32 Claims, 8 Drawing Sheets

LOW VOLTAGE DIFFERENTIAL SIGNALING DRIVERS INCLUDING BRANCHES WITH SERIES RESISTORS

CROSS-REFERENCE TO RELATED PATENT APPLICATION

This application claims the benefit under 35 USC § 119 of Korean Patent Application No. 10-2004-0107994, filed on Dec. 17, 2004, the disclosure of which is hereby incorporated herein by reference in its entirety as if set forth fully herein.

FIELD OF THE INVENTION

The present invention relates to driver circuits and methods, and more particularly to low voltage differential signaling drivers and associated methods.

BACKGROUND OF THE INVENTION

Various signal transmission methods for transmitting data between elements of one device or between two or more devices have been developed.

FIG. 1 is a circuit diagram of a current mode logic (CML) system using a conventional signal transmission method. Specifically, FIG. 1 illustrates the transmission of a signal between a transmission unit TX of a first chip CP1 and a reception unit RX of a second chip CP2 via transmission lines TL and TLB. Referring to FIG. 1, output pads DQ1 and DQB1 of the transmission unit TX and output pads DQ2 and DQB2 of the reception unit RX are connected to termination resistors having a resistance of 50Ω, which can reduce or eliminate signal reflection.

The CML system 100 can transmit and receive signals using the same output pads by connecting the output pads DQ1 and DQB1 of the transmission unit TX of the first chip CP1 to a reception unit of the first chip CP1 and connecting the output pads DQ2 and DQB2 of the reception unit RX of the second chip CP2 to a transmission unit of the second chip CP2. This type of structure is called half-duplex.

Since the CML system 100 has a half-duplex structure, it can reduce the number of pins conventionally used for transmitting and receiving signals in half, can reduce signal reflection, and can achieve high operating speed. Thus, the CML system 100 may be used in a RAMBUS DRAM.

In the CML system 100, however, the output pads DQ1 and DQB1 are connected to the termination resistors having a resistance of 50Ω in parallel. Thus, the transmission unit TX may need a current Io of about 16 mA to maintain a voltage difference between a signal transmitted via the transmission line TL and a signal transmitted via the transmission line TLB at about 400 mV. In other words, the transmission unit TX or reception unit of the first chip CP1 or the transmission unit or reception unit RX of the second chip CP2 may use a considerable amount of power.

Another conventional signal transmission method is a low voltage differential signaling method in which a difference between the voltages of two transmission lines is transmitted as a signal. A low voltage differential signaling driver is widely used for various purposes, such as driving signals from a transmission unit to a reception unit. A low voltage differential signaling driver can quickly transmit signals even with low power and can have low electromagnetic interference (EMI) characteristics.

FIG. 2 is a circuit diagram of a conventional low voltage differential signaling driver 200. Referring to FIG. 2, the conventional low voltage differential signaling driver 200 includes a first chip CP1 and a second chip CP2. A transmission unit TX of the first chip CP1 includes a first current source IS1, which is connected to a power supply voltage VDD, a second current source IS2, which is connected to a ground voltage VSS, PMOS transistors TR1 and TR2, which are connected to the first current source IS1 in parallel, and NMOS transistors TR3 and TR4, which are connected to the second current source IS2 in parallel.

An input signal is applied to the transistors TR1 and TR3, and another input signal is applied to the transistors TR2 and TR4.

The first or second current source IS1 or IS2 is controlled so that two of the four transistors TR1, TR2, TR3, and TR4 can be turned on at the same time, thus generating a voltage at a termination resistor R. In order to let a current flow from a transmission line TL to a transmission line TLB via the termination resistor R, the transistors TR1 and TR4 should be turned on, and the transistors TR2 and TR3 should be turned off.

Since the termination resistor R may have a resistance of 100Ω, the transmission unit TX of the conventional low voltage differential signaling driver 200 may need a current Io of about 4 mA to maintain a difference of about 400 mV between the voltage of a signal transmitted via the transmission line TL and the voltage of a signal transmitted via the transmission line TLB. Accordingly, the conventional low voltage differential signaling driver 200 can consume a smaller amount of current than the CML system 100 of FIG. 1.

However, in the conventional low voltage differential signaling driver 200, unlike in the CML system 100 of FIG. 1, the termination resistor R may only be installed in a reception unit RX of the second chip CP2. Thus, the transmission unit TX of the first chip CP1 may suffer from signal reflections and severe noise.

In addition, such an asymmetry between the transmission unit TX of the first chip CP1 and the reception unit RX of the second chip CP2 may prevent the conventional low voltage differential signaling driver 200 from adopting a half-duplex structure. Thus, the number of pins used by the conventional low voltage differential signaling driver 200 to transmit and receive signals may increase.

FIG. 3A is a circuit diagram of another version of a conventional low voltage differential signaling driver 200 of FIG. 2, i.e., a conventional low voltage differential signaling driver 300, and FIG. 3B is a detailed circuit diagram illustrating an internal structure of the conventional low voltage differential signaling driver 300 of FIG. 3A. Referring to FIG. 3A, the conventional low voltage differential signaling driver 300 has the same structure as the conventional low voltage differential signaling driver 200 of FIG. 2 except that termination resistors R1 are installed in a transmission unit TX of a first chip CP1. Accordingly, the structure of the transmission unit TX of the first chip CP1 and the structure of a reception unit RX of a second chip CP2 are symmetrical, and thus the conventional low voltage differential signaling driver 300 can reduce signal reflections.

Referring to FIG. 3B, switches SW are turned on when the transmission unit TX of the first chip CP1 operates and are turned off when the reception unit RX of the second chip CP2 operates.

The termination resistors R1 each having a resistance of, for example, 50Ω are connected to each other in series in the transmission unit TX of the first chip CP1, and termination resistors R2 each having a resistance of, for example, 50Ω are connected to each other in series in a transmission unit TX of the second chip CP2. Thus, the structures of the transmission unit TX and a reception unit RX of the first chip CP1 and the structures of the transmission unit TX and a reception unit RX of the second chip CP2 are symmetrical, and thus, the conventional low voltage differential signaling driver 300 can reduce signal reflections and adopt a half-duplex structure.

In the conventional low voltage differential signaling driver 300, the termination resistors R1 and R2 are connected in parallel. Thus, the conventional low voltage differential signaling driver 300 has a total resistance of 50Ω. Accordingly, the transmission unit TX of the first or second chip CP1 or CP2 may need a current Io of about 8 mA to maintain a difference of about 400 mV between the voltage of a signal transmitted via a transmission line TL and the voltage of a signal transmitted via a transmission line TLB. Therefore, the conventional low voltage differential signaling driver 300 may consume a larger amount of current than the conventional low voltage differential signaling driver 200 of FIG. 2.

SUMMARY OF THE INVENTION

Exemplary embodiments of the present invention can provide low voltage differential signaling drivers which can minimize signal reflections by transmitting signals using terminal resistors installed in a transmission unit, can reduce the number of pins by half by using pins for both transmitting and receiving signals, and/or can achieve high operating speed while consuming less power.

According to some embodiments of the invention, a low voltage differential signal driver includes first and second current sources, a first branch and a second branch. The first branch comprises at least two transistors and at least two resistors therebetween that are all connected in series between the first and second current sources, to define a first node between adjacent resistors that is configured to transmit and receive differential signals. The second branch also comprises at least two transistors and at least two resistors therebetween that also are all connected in series between the first and second current sources, to define a second node between adjacent resistors that is also configured to transmit and receive differential signals.

Other embodiments of the present invention provide low voltage differential signaling drivers which receive data and transmit and receive differential signals via transmission lines. These low voltage differential signaling drivers include: first and second current sources, which are connected to a power supply voltage and a ground voltage, respectively; a first branch, which comprises at least two transistors connected to each other in series between the first and second current sources and a first node connected to one of the transmission lines; and a second branch, which comprises at least two transistors connected to each other at a second node in series between the first and second current sources and a second node connected to another of the transmission lines. The first branch further comprises resistors connected to each other in series between the transistors, which can reduce signal reflections caused by load resistance connected to the transmission lines, and the second branch further comprises resistors connected to each other in series between the transistors, which can reduce signal reflections caused by the load resistance connected to the transmission lines.

The first branch may include: a first transistor which has a first controlled electrode (e.g., source/drain) connected to the first current source and has a controlling electrode (e.g., gate) to which the data is input; a first resistor which has one end (terminal) connected to a second controlled electrode of the first transistor and has the other end connected to the first node; a second transistor which has a first controlled electrode connected to the second current source and has a controlling electrode to which the data is input; and a second resistor which has one end connected to the first node and has the other end connected to a second controlled electrode of the second transistor.

The second branch may include: a third transistor which has a first controlled electrode connected to the first current source and a controlling electrode to which inverted data is input, the inverted data having a logic level opposite to the logic level of the data; a third resistor which has one end connected to a second controlled electrode of the third transistor and has the other end connected to the second node; a fourth transistor which has a first controlled electrode connected to the second current source and has a controlling electrode to which the inverted data is input; and a fourth resistor which has one end connected to the second node and has the other end connected to a second controlled electrode of the fourth transistor.

In some embodiments, if the data has a second logic level, the first and fourth transistors are turned on, and the second and third transistors are turned off, and if the data has a first logic level, the second and third transistors may be turned on, and the first and fourth transistors may be turned off.

In some embodiments, if the data has the second logic level, a result of summing up a total resistance of a current path formed between the first current source and the first node and a total resistance of a current path formed between the second node and the second current source may be equal to the load resistance that is connected to the first and second transmission lines.

In some embodiments, if the data has the first logic level, a result of summing up a total resistance of a current path formed between the first current source and the second node and a total resistance of a current path formed between the first node and the second current source may be equal to the load resistance.

Moreover, if the load resistance is 2 Z, each of the first through fourth resistors may have a resistance of 0.9 Z, in some embodiments.

The low voltage differential signaling driver may also include a control switch which is provided between a third node and a fourth node, the third node connecting the first transistor and the first resistor and the fourth node connecting the third transistor and the third resistor.

In some embodiments, if differential signals are input to the low voltage differential signaling driver via the transmission lines, all of the first through fourth transistors may be turned off, and the control switch may be turned on.

Other embodiments of the present invention provide low voltage differential signaling drivers. These low voltage differential signaling drivers include: a driving unit which is configured to output a pull-down signal having a first common mode voltage level and a pull-up signal having a second common mode voltage level in response to a control signal, a clock signal, and data; a transmission unit which is configured to output an output differential signal via transmission lines in response to the pull-up signal and the pull-down signal output from the driving unit; and a reception unit which is configured to receive an input differential signal via the transmission lines. In some embodiments, the transmission unit includes: first and second current sources, which are connected to a power supply voltage and a ground voltage, respectively; a first branch, which comprises at least two transistors connected to each other in series between the first and second current sources and a first node connected to one of the transmission lines; and a second branch, which comprises at least two transistors connected to each other in series between the first and second current sources and a second node connected to another of the transmission lines. The first branch also includes resistors connected to each other in series between the transistors, which can reduce signal reflections caused by load resistance connected to the transmission lines, and the second branch further comprises resistors connected to each other in series between the transistors, which can reduce signal reflections caused by the load resistance connected to the transmission lines. Other embodiments of transmission units including first and second branches also may be provided.

In some embodiments, the first common mode voltage level may be a voltage level suitable for controlling an NMOS transistor at high speed, the second common mode voltage level may be a voltage level suitable for controlling a PMOS transistor at high speed, and the first common mode voltage level may be higher than the second common mode voltage level.

In some embodiments, the driving unit may include: a first controller which is configured to control the logic levels of the pull-down signal and an inverted pull-down signal based on a logic level of the data in response to the control signal and the clock signal; and a second controller which is configured to control the logic levels of the pull-up signal and an inverted pull-up signal based on the logic level of the data in response to an inverted control signal and an inverted clock signal.

In some embodiments, the first controller may include: a pull-down signal generator which is configured to generate the pull-down signal whose logic level is opposite to the logic level of the data in response to the control signal and the clock signal; and an inverted pull-down signal generator which is configured to generate the inverted pull-down signal whose logic level is identical to the logic level of the data in response to the control signal and the clock signal.

In some embodiments, the pull-down signal generator may include: a first control resistor which is connected between the power supply voltage and a first control node; a first control transistor, the controlled electrodes of which are connected between the first control node and the ground voltage and the controlling electrode of which is connected to the control signal; and second and third control transistors, the controlled electrodes of which are connected to each other in series between the first control node and the ground voltage and the controlling electrodes of which are connected to the clock signal and the data, respectively. The inverted pull-down signal generator may include: a second control resistor which is connected between the power supply voltage and a second control node; a fourth control transistor, the controlled electrodes of which are connected between the second control node and the ground voltage and the controlling electrode of which is connected to the control signal; and fifth and sixth control transistors, the controlled electrodes of which are connected to each other in series between the second control node and the ground voltage and the controlling electrodes of which are connected to the clock signal and inverted data, respectively.

In some embodiments, the second controller may include: a pull-up signal generator which is configured to generate the pull-up signal whose logic level is identical to the logic level of the data in response to the inverted control signal and the inverted clock signal; and an inverted pull-up signal generator which is configured to generate the inverted pull-up signal whose logic level is opposite to the logic level of the data in response to the inverted control signal and the inverted clock signal.

In some embodiments, the pull-up signal generator may include: first and second inverted control transistors, the controlled electrodes of which are connected in series between the power supply voltage and a first inverted control node and the controlling electrodes of which are connected to the inverted data and the inverted clock signal, respectively; a third inverted control transistor, the controlled electrodes of which are connected between the power supply voltage and the first inverted control node and the controlling electrode of which is connected to the inverted control signal; and a third control resistor which is connected between the first inverted control node and the ground voltage. The inverted pull-up signal generator may include: fourth and fifth inverted control transistors, the controlled electrodes of which are connected to each other in series between the power supply voltage and a second inverted control node and the controlling electrodes of which are connected to the data and the inverted clock signal, respectively; a sixth inverted control transistor, the controlled electrodes of which are connected between the power supply voltage and the second inverted control node and the controlling electrode of which is connected to the inverted control signal; and a fourth control resistor which is connected between the second inverted control node and the ground voltage.

In some embodiments, the first branch may include: a first transistor which has a first controlled electrode connected to the first current source and has a controlling electrode to which the data is input; a first resistor which has one end connected to a second controlled electrode of the first transistor and has the other end connected to the first node; a second transistor which has a first controlled electrode connected to the second current source and has a controlling electrode to which the data is input; and a second resistor which has one end connected to the first node and has the other end connected to a second controlled electrode of the second transistor. The second branch may also include: a third transistor which has a first controlled electrode connected to the first current source and has a controlling electrode to which inverted data is input, the inverted data having a logic level opposite to the logic level of the data; a third resistor which has one end connected to a second controlled electrode of the third transistor and has the other end connected to the second node; a fourth transistor which has a first controlled electrode connected to the second current source and has a controlling electrode to which the inverted data is input; and a fourth resistor which has one end connected to the second node and has the other end connected to a second controlled electrode of the fourth transistor.

In some embodiments, if the data has a second logic level, the first and fourth transistors may be turned on, and the second and third transistors may be turned off, and if the data has a first logic level, the second and third transistors may be turned on, and the first and fourth transistors may be turned off.

In some embodiments, if the data has the second logic level, a result of summing up a total resistance of a current path formed between the first current source and the first node and a total resistance of a current path formed between the second node and the second current source may be equal to the load resistance.

In some embodiments, if the data has the first logic level, a result of summing up a total resistance of a current path formed between the first current source and the second node and a total resistance of a current path formed between the first node and the second current source may be equal to the load resistance.

In some embodiments, if the load resistance is 2 Z, each of the first through fourth resistors may have a resistance of 0.9 Z.

The low voltage differential signaling driver may also include a control switch which is provided between a third node and a fourth node, the third node connecting the first transistor and the first resistor and the fourth node connecting the third transistor and the third resistor, in some embodiments.

If differential signals are input to the low voltage differential signaling driver via the transmission lines, all of the first through fourth transistors may be turned off, and the control switch may be turned on, in some embodiments.

Other embodiments of the present invention provide data communication systems. These data communication systems can include first and second low voltage differential signaling drivers which are connected to each other via transmission lines and transmit data to or receive data from each other via the transmission lines. The first low voltage differential signaling driver includes a driving unit, which is configured to reduce signal reflections using termination resistance which is same as load resistance of the second low voltage differential signaling driver and is configured to enhance the speed of transmitting data by controlling the logic level of the data. The second low voltage differential signaling driver has same structure as the first low voltage differential signaling driver.

The first low voltage differential signaling driver may include: the driving unit which is configured to output a pull-down signal having a first common mode voltage level and a pull-up signal having a second common mode voltage level in response to a control signal, a clock signal, and data; a transmission unit which is configured to output an output differential signal via transmission lines in response to the pull-up signal and the pull-down signal output from the driving unit; and a reception unit which is configured to receive an input differential signal via the transmission lines. The transmission unit may include: first and second current sources, which are connected to a power supply voltage and a ground voltage, respectively; a first branch, which comprises at least two transistors connected to each other in series between the first and second current sources and a first node connected to one of the transmission lines; and a second branch, which comprises at least two transistors connected to each other in series between the first and second current sources and a second node connected to another of the transmission lines. The first branch may also include resistors connected to each other in series between the transistors, which can reduce signal reflections caused by load resistance connected to the transmission lines, and the second branch further comprises resistors connected to each other in series between the transistors, which can reduce signal reflections caused by the load resistance connected to the transmission lines. Other embodiments of transmission units including first and second branches also may be provided.

In some embodiments, the first common mode voltage level may be a voltage level suitable for controlling an NMOS transistor at high speed, the second common mode voltage level may be a voltage level suitable for controlling a PMOS transistor at high speed, and the first common mode voltage level is higher than the second common mode voltage level.

In some embodiments, the driving unit may include: a first controller which is configured to control the logic levels of the pull-down signal and an inverted pull-down signal based on the logic level of the data in response to the control signal and the clock signal; and a second controller which controls the logic levels of the pull-up signal and an inverted pull-up signal based on the logic level of the data in response to an inverted control signal and an inverted clock signal.

In some embodiments, the first controller may include: a pull-down signal generator which is configured to generate the pull-down signal whose logic level is opposite to the logic level of the data in response to the control signal and the clock signal; and an inverted pull-down signal generator which is configured to generate the inverted pull-down signal whose logic level is identical to the logic level of the data in response to the control signal and the clock signal.

In some embodiments, the pull-down signal generator may include: a first control resistor which is connected between the power supply voltage and a first control node; a first control transistor, the controlled electrodes of which are connected between the first control node and the ground voltage and the controlling electrode of which is connected to the control signal; and second and third control transistors, the controlled electrodes of which are connected to each other in series between the first control node and the ground voltage and the controlling electrodes of which are connected to the clock signal and the data, respectively. The inverted pull-down signal generator may include: a second control resistor which is connected between the power supply voltage and a second control node; a fourth control transistor, the controlled electrodes of which are connected between the second control node and the ground voltage and the controlling electrode of which is connected to the control signal; and fifth and sixth control transistors, the controlled electrodes of which are connected to each other in series between the second control node and the ground voltage and the controlling electrodes of which are connected to the clock signal and inverted data, respectively.

In some embodiments, the second controller may include: a pull-up signal generator which is configured to generate the pull-up signal whose logic level is identical to the logic level of the data in response to the inverted control signal and the inverted clock signal; and an inverted pull-up signal generator which is configured to generate the inverted pull-up signal whose logic level is opposite to the logic level of the data in response to the inverted control signal and the inverted clock signal.

In some embodiments, the pull-up signal generator may include: first and second inverted control transistors, the controlled electrodes of which are connected in series between the power supply voltage and a first inverted control node and the controlling electrodes of which are connected to the inverted data and the inverted clock signal, respectively; a third inverted control transistor, the controlled electrodes of which are connected between the power supply voltage and the first inverted control node and the controlling electrode of which is connected to the inverted control signal; and a third control resistor which is connected between the first inverted control node and the ground voltage. The inverted pull-up signal generator include: fourth and fifth inverted control transistors, the controlled electrodes of which are connected to each other in series between the power supply voltage and a second inverted control node and the controlling electrodes of which are connected to the data and the inverted clock signal, respectively; a sixth inverted control transistor, the controlled electrodes of which are connected between the power supply voltage and the second inverted control node and the controlling electrode of which is connected to the inverted control signal; and a fourth control resistor which is connected between the second inverted control node and the ground voltage.

According to other embodiments of the present invention, there is provided a data communication method for a low voltage differential signaling driver which comprises first and second branches and a control switch which controls the reception of a differential signal and which transmits and receives the differential signal via transmission lines in response to data. The data communication method may include: determining whether to transmit or receive a differential signal; turning off the control switch if it is determined to transmit the differential signal; selectively turning on transistors included in the first and second branches according to the voltage level of data input to the low voltage differential signaling driver; and outputting the differential signal to the transmission lines using a current path formed by the transistors that are turned on.

In some embodiments, the data communication method may also include: turning on the control switch if it is determined to receive the differential signal; and receiving the differential signal via the transmission lines.

In some embodiments, the first branch may include: at least two transistors connected to each other at a first node in series between first and second current sources, resistors connected to each other in series between the transistors, and a first node connected to one of the transmission lines, the first and second current sources being connected to a power supply voltage and a ground voltage, respectively. The second branch may include at least two transistors connected to each other in series between the first and second current sources, resistors connected to each other in series between the transistors, and a second node connected to another of the transmission lines. Other embodiments of the first and second branches also may be provided.

In some embodiments, if the data has the second logic level, a result of summing up a total resistance of a current path formed between the first current source and the first node and a total resistance of a current path formed between the second node and the second current source may be equal to a load resistance which is connected to the transmission lines.

In other embodiments, if the data has the first logic level, a result of summing up a total resistance of a current path formed between the first current source and the second node and a total resistance of a current path formed between the first node and the second current source may be equal to the load resistance which is connected to the transmission lines.

In other embodiments, if the control switch is turned on, all of the transistors included in the first and second branches may be turned off.

In some embodiments, the selectively turning on of the transistors included in the first and second branches according to the voltage level of the input data includes: controlling the voltage level of the input data; and applying the input data whose voltage level has been controlled to the transistors included in the first and second branches.

Finally, in some embodiments, in the controlling of the voltage level of the input data, the voltage level of the input data may be controlled based on a common mode voltage level of the transistors included in the first and second branches.

DETAILED DESCRIPTION OF THE INVENTION

Figure 1:
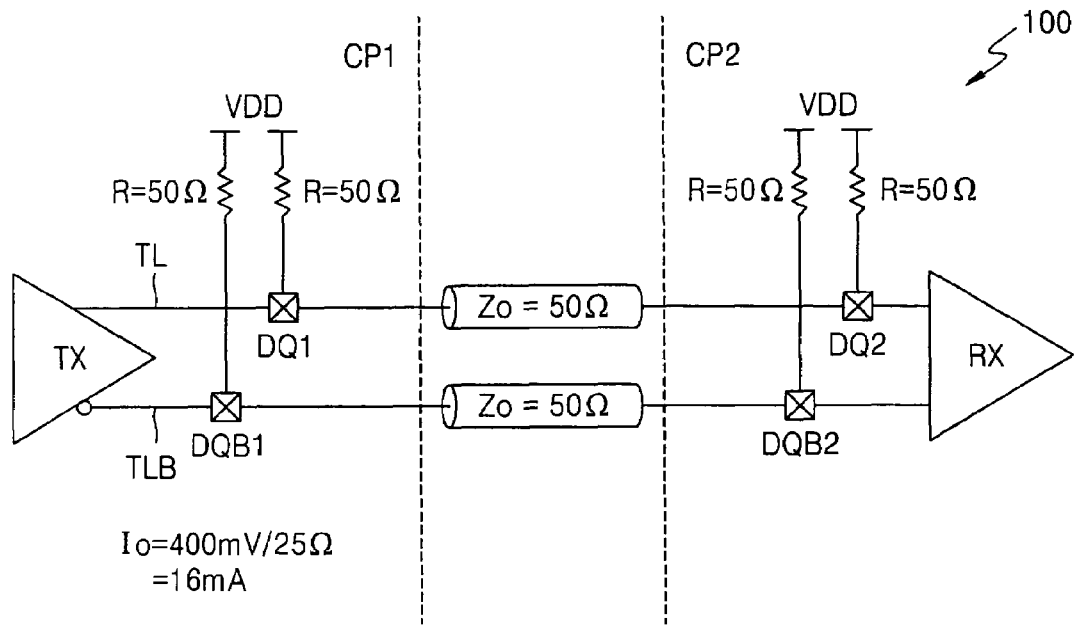
FIG. 1 is a circuit diagram of a conventional current mode logic (CML) system.
Figure 2:
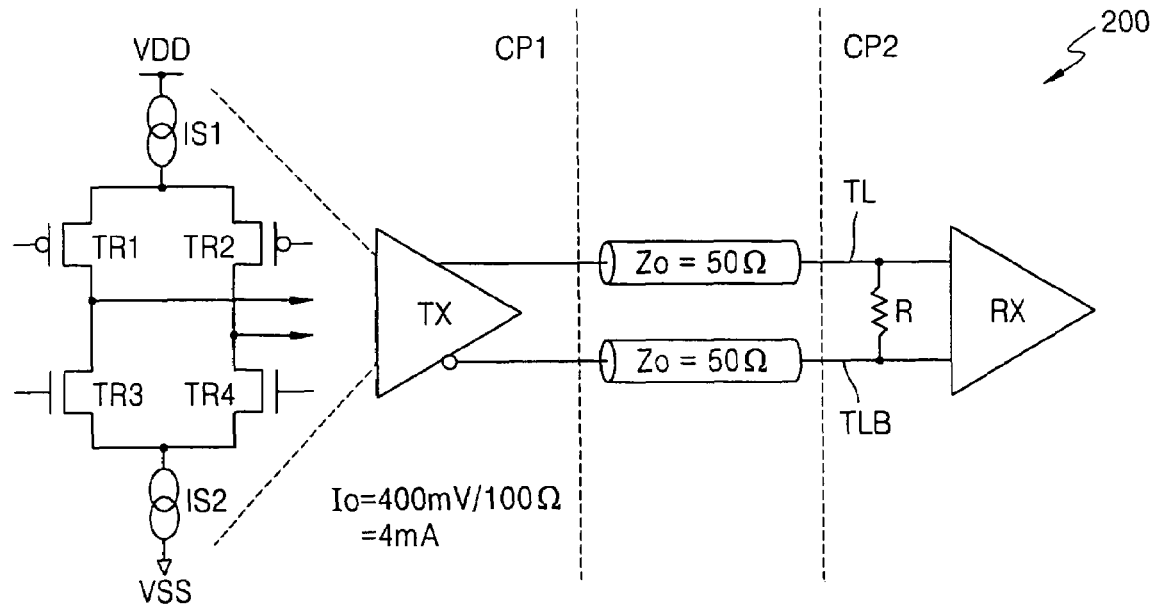
FIG. 2 is a circuit diagram of a conventional low voltage differential signaling driver.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/". Moreover, each embodiment described and illustrated herein includes its complementary conductivity type embodiment as well.

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be understood by those having skill in the art that transistors may be referred to herein generically as including first and second controlled electrodes, which may correspond to first and second source/drain regions of a field effect transistor or emitter and collector regions of a bipolar transistor, and a controlling electrode which may correspond to a gate of a field effect transistor or a base of a bipolar transistor. Moreover, any references to two items, such as two transistors or two resistors that are connected together contemplate more than two items being connected together. Thus, for example, a first branch may comprise three transistors and three resistors that are all connected in series between first and second current sources. Finally, the two terminals of a resistor are referred to herein as "ends", although they need not correspond to physical ends of resistive material.

Figure 4:
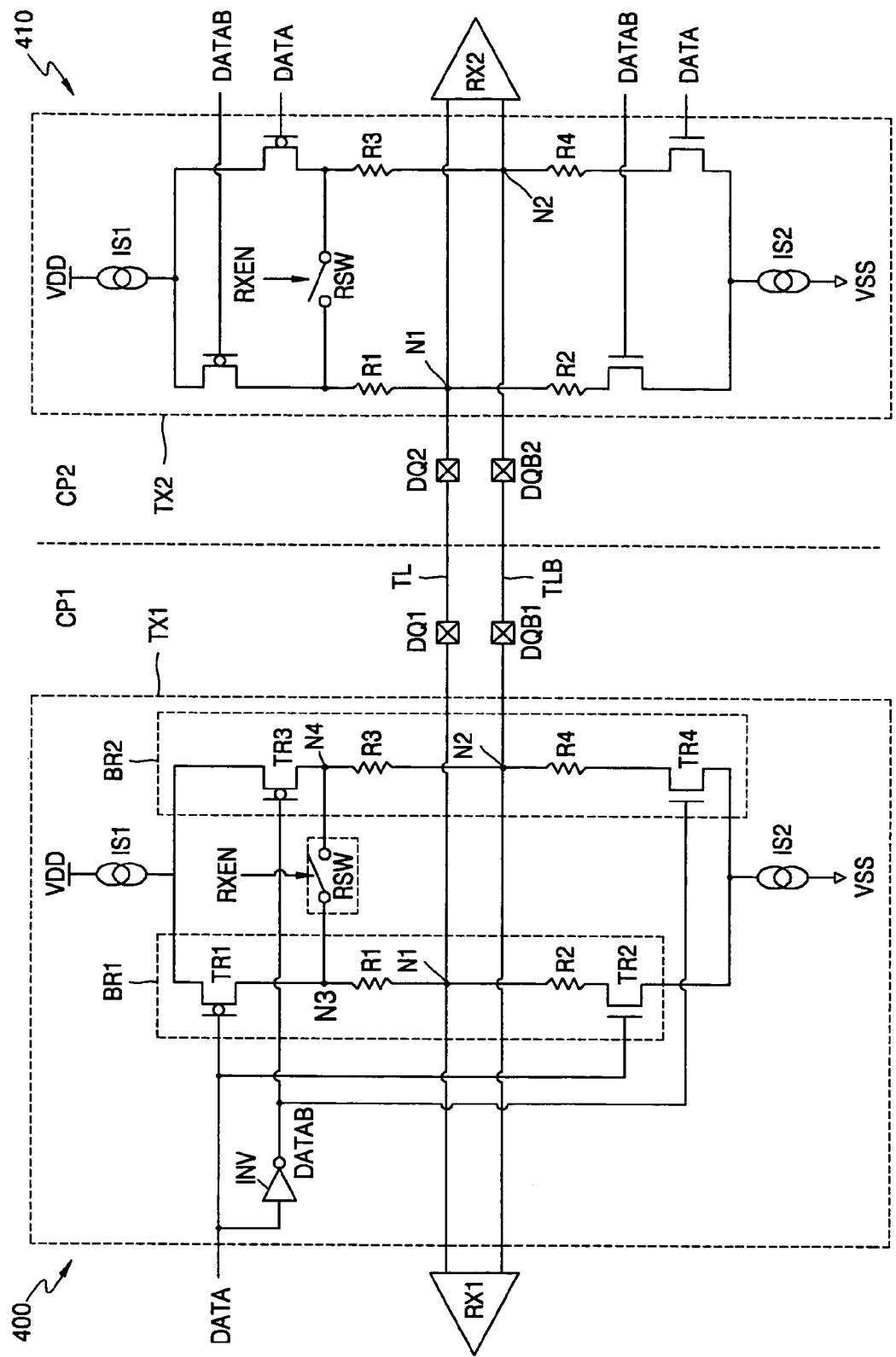
FIG. 4 is a circuit diagram of low voltage differential signaling drivers according to exemplary embodiments of the present invention.

FIG. 4 is a circuit diagram of low voltage differential signalling drivers 400 and 410 according to exemplary embodiments of the present invention. Referring to FIG. 4, in some embodiments, when a first chip CP1 transmits signals to a second chip CP2, the low voltage differential signalling driver 400 can reduce signal reflections by making the termination resistance of a transmission unit TX1 of the first chip CP1 equal to the termination resistance of a transmission unit TX2 of the second chip CP2. Moreover, in some embodiments, when the first chip CP1 receives signals from the second chip CP2, the low voltage differential signalling driver 400 removes the termination resistance of the transmission unit TX1 using a control switch RSW so that only the termination resistance of a reception unit RX1 of the first chip CP1 is left.

In addition, the low voltage differential signalling driver 400 can reduce the number of pins by half by using the same pins for both transmitting and receiving signals and can transmit and receive signals at high speed while consuming less power, according to exemplary embodiments of the invention.

The low voltage differential signalling driver 400 receives data and transmits or receives differential signals via transmission lines.

The low voltage differential signalling driver 400 is installed in the first chip CP1, and the low voltage differential signalling driver 410 is installed in the second chip CP2. In some embodiments, the low voltage differential signalling driver 400 has the same structure as the low voltage differential signalling driver 410. The structure and operation of the low voltage differential signalling driver 400 will now be described in further detail.

The low voltage differential signalling driver 400 includes first and second current sources IS1 and IS2, which are connected to a power supply voltage VDD and a ground voltage VSS, respectively, a first branch BR1, and a second branch BR2.

The first branch BR1 includes at least two transistors, i.e., TR1 and TR2, connected in series between the first and second current sources IS1 and IS2 and is connected to one of transmission lines TL and TLB at a first node. The second branch BR2 includes at least two transistors, i.e., TR3 and TR4, connected in series between the first and second current sources IS1 and IS2 and is connected to the other transmission line at a second node N2.

The first branch BR1 also includes first and second resistors R1 and R2 connected in series between the transistors TR1 and TR2, and the second branch BR2 includes third and fourth resistors R3 and R4 connected in series between the transistors TR3 and TR4.

The first and second chips CP1 and CP2 transmit data to each other or receive data from each other via output pads DQ1, DQB1, DQ2, and DQB2 using the respective low voltage differential signalling drivers 400 and 410. Operation of a low voltage differential signalling driver 400 according to exemplary embodiments of the present invention will now be described in detail with reference to FIG. 5.

Figure 5:
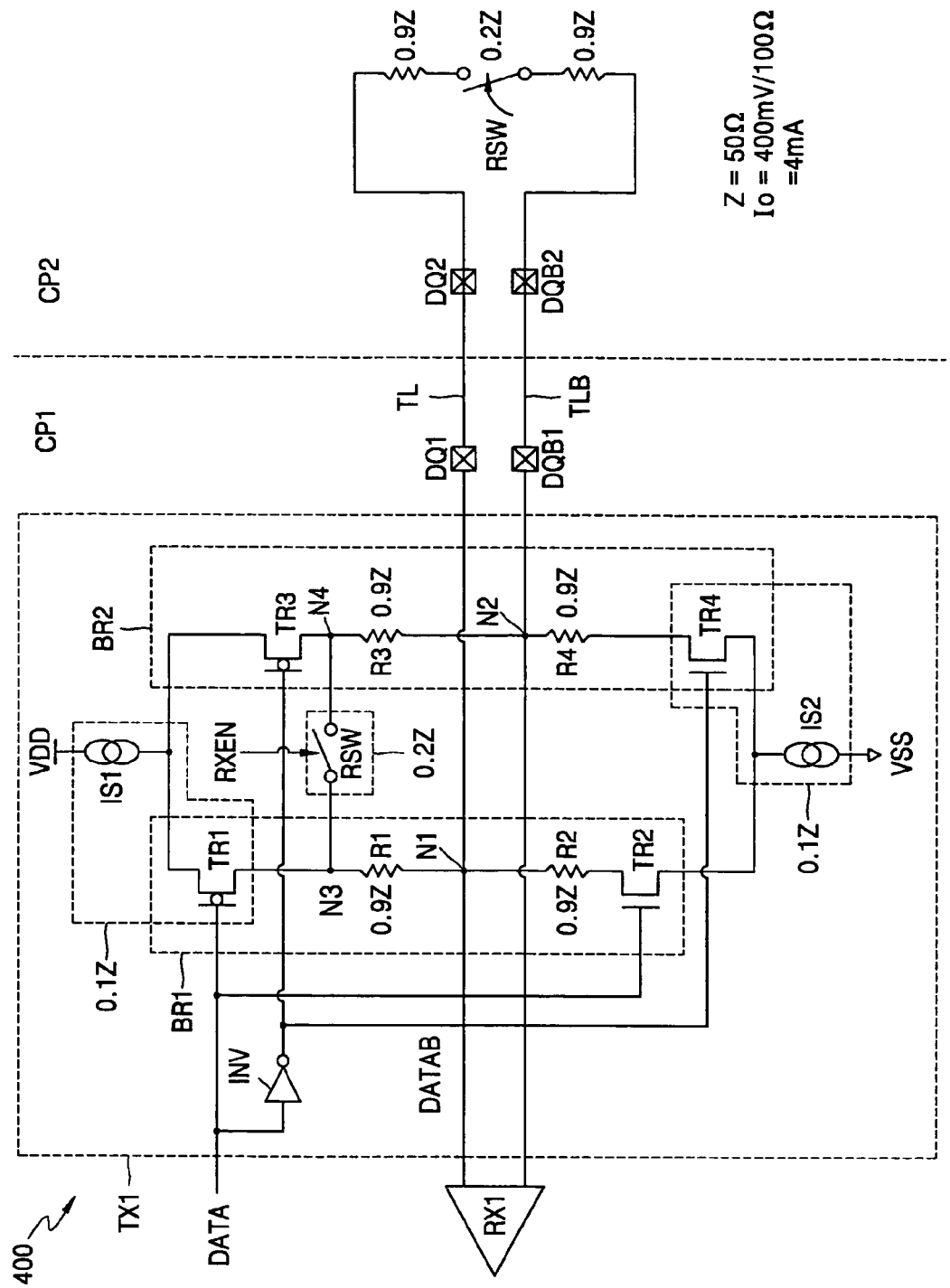
FIG. 5 is a circuit diagram illustrating operation of one of the low voltage differential signaling drivers of FIG. 4 according to exemplary embodiments of the present invention.

FIG. 5 is a circuit diagram illustrating operation of a low voltage differential signalling driver 400 of FIG. 4. Specifically, FIG. 5 illustrates the transmission of data to the second chip CP2 or the reception of data from the second chip CP2 using the low voltage differential signalling driver 400. For explanation, the second chip CP2 is illustrated in FIG. 5 as if it had only resistors.

Referring to FIG. 5, the first branch BR1 includes the first and second transistors TR1 and TR2 and the first and second resistors R1 and R2. A first controlled electrode (e.g., source/drain) of the first transistor TR1 is connected to the first current source IS1, and data DATA is input to a controlling electrode (e.g., gate) of the first transistor TR1. One end of the first resistor R1 is connected to a second controlled electrode of the first transistor TR1, and the other end of the first resistor R1 is connected to a first node N1.

A first controlled electrode of the second transistor TR2 is connected to the second current source IS2, and the data DATA is input to a controlling electrode of the second transistor TR2. One end of the second resistor R2 is connected to the first node N1, and the other end of the second resistor R2 is connected to a second controlled electrode of the second transistor TR2.

The second branch BR2 includes the third and fourth transistors TR3 and TR4 and the third and fourth resistors R3 and R4. A first controlled electrode of the third transistor TR3 is connected to the first current source IS1, and inverted data DATAB, which is an inverted version of the data DATA, is input to a controlling electrode of the third transistor TR3.

One end of the third resistor R3 is connected to a second controlled electrode of the third transistor TR3, and the other end of the third resistor R3 is connected to a second node N2. A first controlled electrode of the fourth transistor TR4 is connected to the second current source IS2, and the inverted data DATAB is input to a controlling electrode of the fourth transistor TR4. One end of the fourth resistor R4 is connected to the second node N2, and the other end of the fourth resistor R4 is connected to a second controlled electrode of the fourth transistor TR4.

Each of the first through fourth resistors R1 through R4 may have a resistance of 0.9 Z where Z is a variable. Each of the elements of the low voltage differential signalling driver 400 has intrinsic resistance. A result of summing the intrinsic resistance of the first current source IS1 and the intrinsic resistance of the first transistor TR1 is about 0.1 Z, and a result of summing the intrinsic resistance of the second current source IS2 and the intrinsic resistance of the fourth transistor TR4 is about 0.1 Z, in some embodiments.

When the control switch RSW in the second chip CP2 is turned on, the resistors of the second chip CP2 have a total resistance of 2 Z. Suppose that data DATA having a second level is input to the first chip CP1 and the second level is a logic low level, the first and fourth transistors TR1 and TR4 are turned on, and the second and third transistors TR2 and TR3 are turned off. As a result, a current path is formed along the first current source IS1, the first node N1, and the output pad DQ1, and a differential signal is output from the output pad DQ1.

The differential signal output from the output pad DQ1 is applied to the output pad DQB1 via the output pad DQ2, the resistors (2 Z) of the second chip CP2, and the output pad DQB2 and then is transmitted to the ground voltage VSS along a current path formed between the second node N2 and the fourth transistor TR4.

In the current path generated when the data DATA having a logic low level is input to the first chip CP1, a total resistance of the first chip CP1 is equal to the total resistance of the resistors of the second chip, i.e., 2 Z. In other words, the low voltage differential signalling driver 400 of FIG. 5 has the same termination resistance as the total resistance of the resistors of the second chip CP2 when transmitting the data DATA to the second chip CP2, which can reduce or minimize signal reflections caused by load resistance, according to some embodiments of the invention.

Figure 6:
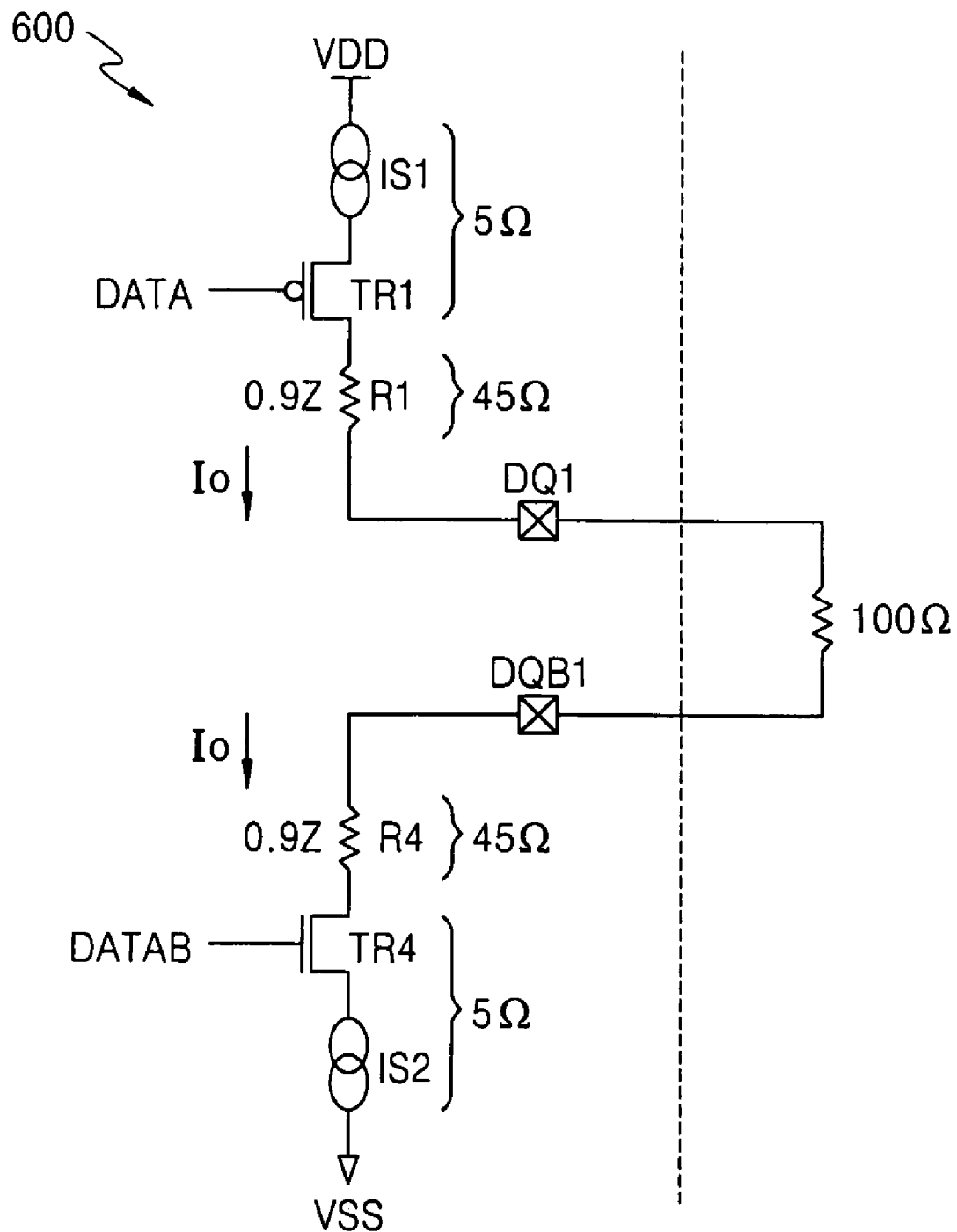
FIG. 6 is a circuit diagram illustrating a current path formed in a low voltage differential signaling driver of FIG. 5 in response to data having a logic low level according to exemplary embodiments of the present invention.

FIG. 6 is a circuit diagram illustrating a current path formed in the low voltage differential signal driver 400 of FIG. 5 according to exemplary embodiments of the invention. Referring to FIG. 6, if Z is 50Ω, the first current source IS1 and the first transistor TR1 have a resistance of 5Ω together, the first resistor R1 has a resistance of 45Ω, the fourth resistor R4 has a resistance of 45Ω, and the fourth transistor TR4 and the second current source IS2 have a resistance of 5Ω together.

Since the total resistance of the first chip CP1 is 100Ω and the total resistance of the resistors of the second chip CP2 is 100Ω, it is possible to reduce the probability of the resistors of the second chip CP2 reflecting signals output via the output pads DQ1 and DQB1.

Figure 3A:
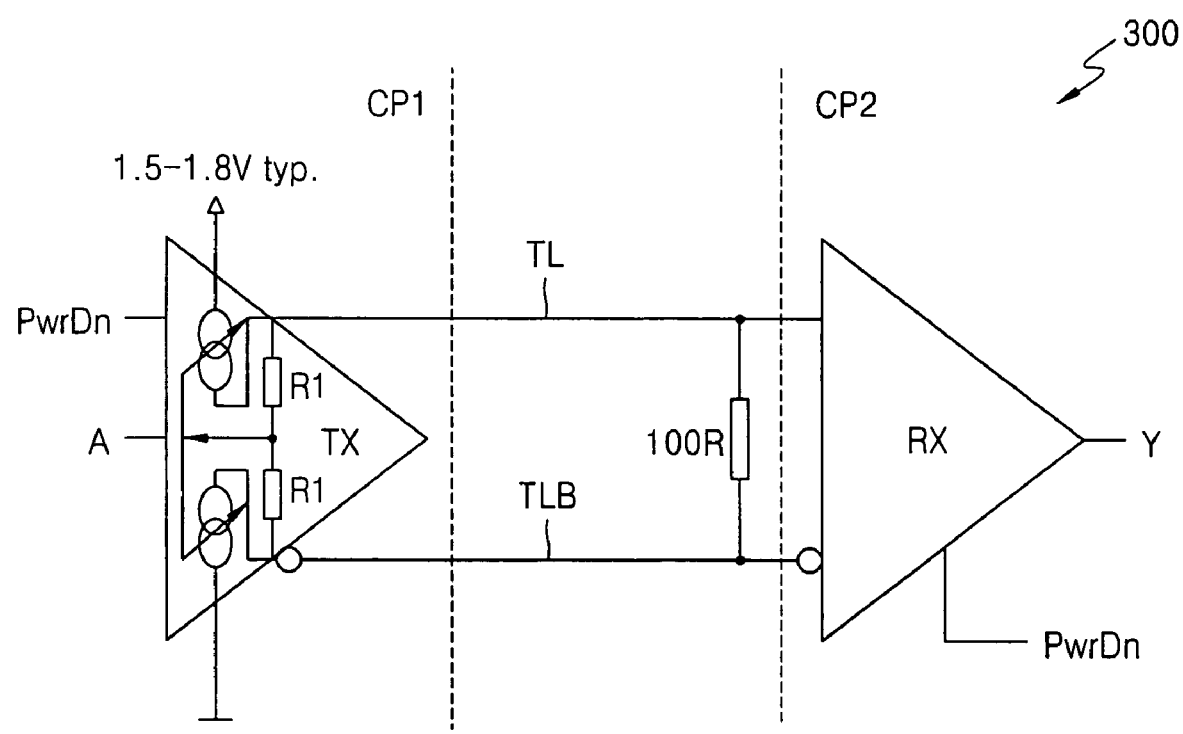
FIG. 3A is a circuit diagram of another conventional low voltage differential signaling driver.
Figure 3B:
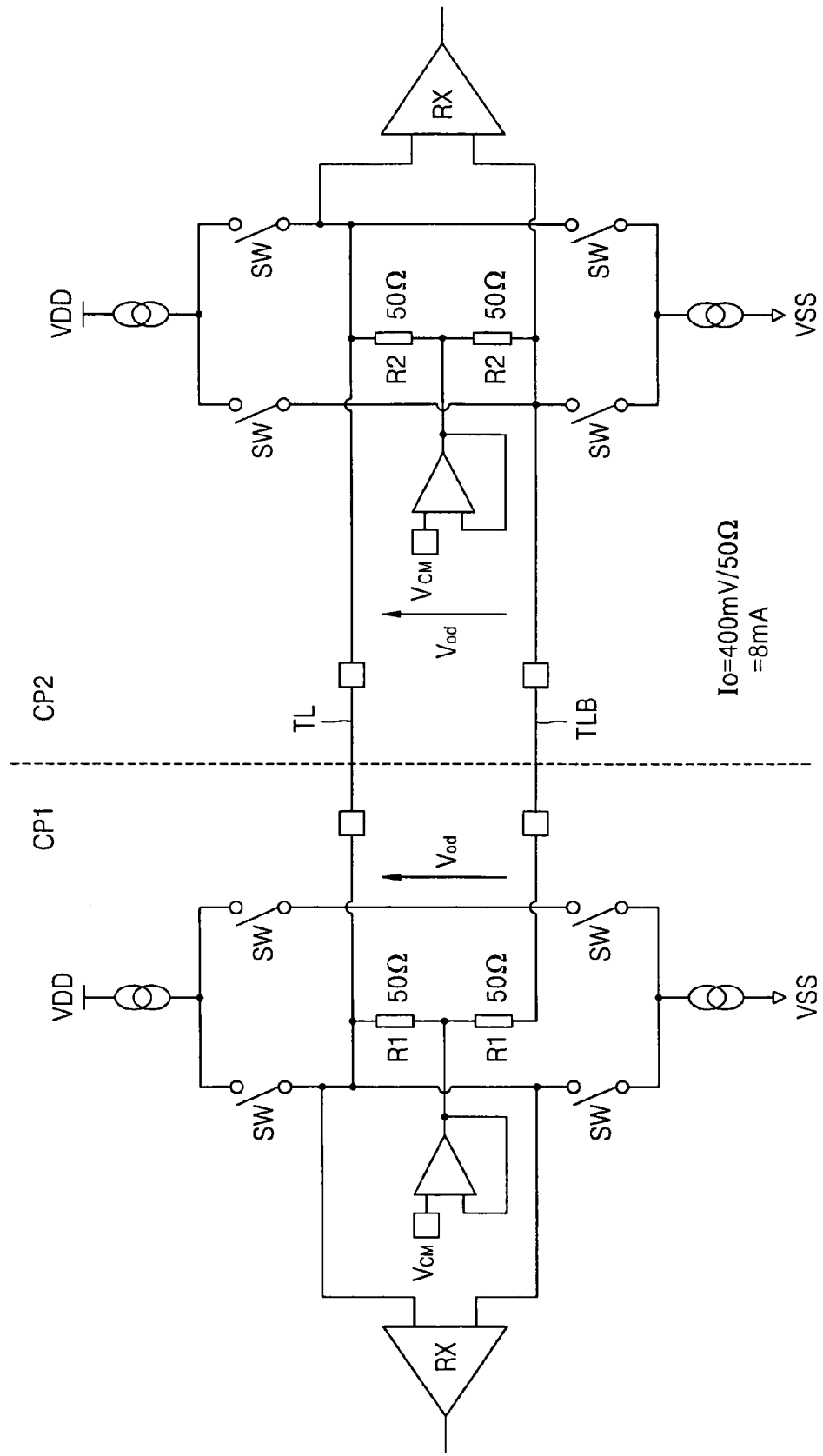
FIG. 3B is a detailed circuit diagram of the conventional low voltage differential signaling driver of FIG. 3A.

Since the resistance of the first chip CP1 is 100Ω, the transmission unit TX of the first chip CP1 may need a current Io of about 4 mA to maintain a difference of about 400 mV between the voltage of a signal transmitted via the transmission line TL and the voltage of a signal transmitted via the transmission line TLB. Accordingly, the low voltage differential signalling driver 400 can consume less power than the conventional low voltage differential signalling driver 300 of FIG. 3A, according to some embodiments of the invention.

In addition, the low voltage differential signalling driver 400 installed in the first chip CP1 and the low voltage differential signalling driver 410 installed in the second chip CP2 can have the same structure and are symmetrical, so that each of the low voltage differential signalling drivers 400 and 410 may adopt a half-duplex structure. Thus, each of the low voltage differential signalling drivers 400 and 410 can reduce the number of pins used for transmitting and receiving the data DATA, according to some embodiments of the invention.

Referring again to FIG. 5, when receiving data DATA output from the second chip CP2, the low voltage differential signalling driver 400 uses a control switch RSW.

The low voltage signalling driver 400 includes the control switch RSW between a third node N3, which is a node connecting the first transistor TR1 and the first resistor R1, and a fourth node N4, which is a node connecting the third transistor TR3 and the third resistor R3.

If differential signals, i.e., the data DATA, are input from the second chip CP2 via the transmission lines TL and TLB, all of the first through fourth transistors TR1 through TR4 are turned off, and the control switch RSW is turned on. The control switch RSW is turned on and off in response to a control signal RXEN. The control signal RXEN is a signal which is activated and then turns on the control switch RSW when the low voltage differential signalling driver 400 receives the data DATA from the second chip CP2.

Accordingly, all of the first through fourth transistors TR1 through TR4 and the first and second current sources IS1 and IS2 do not operate, and the low voltage differential signalling driver 400 operates in accordance with the resistors of the second chip CP2. Suppose that the control switch RSW has an intrinsic resistance of 0.2 Z and Z is, for example, 50 Ω.

Then, the output pad DQ1, the first node N1, the first resistor R1, the control switch RSW, the third resistor R3, the second node N2, and the output pad DQB1 have a total resistance of 100Ω together. In other words, the resistance of the first chip CP1 is equal to the total resistance of the resistors of the second chip CP2, according to some embodiments of the invention.

When transmitting the data DATA to the second chip CP2, the low voltage differential signalling driver 400 turns off the control switch RSW, and forms the same termination resistance as the total resistance of the resistors of the second chip CP2 using the first through fourth resistors R1 through R4.

Figure 7:
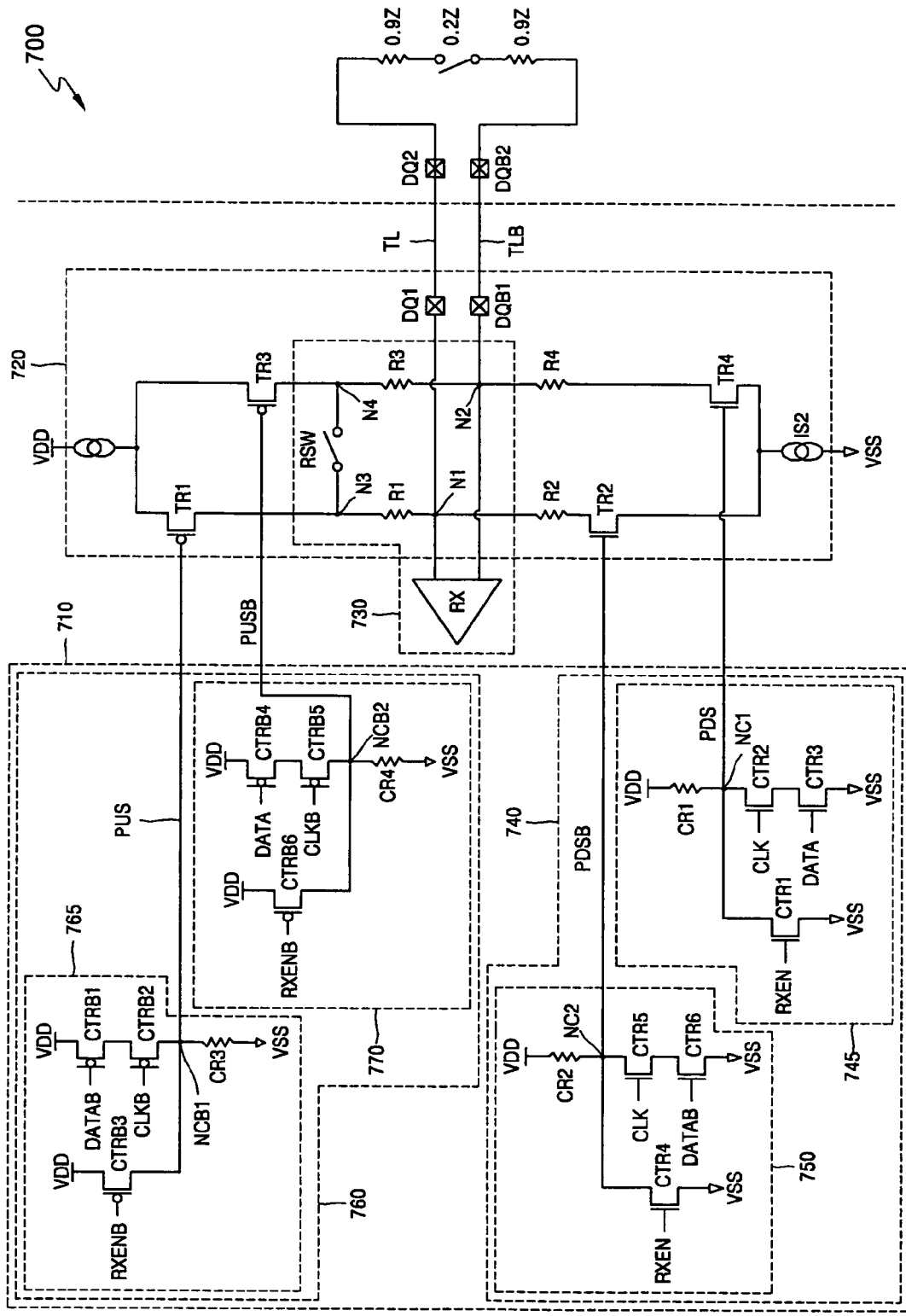
FIG. 7 is a circuit diagram of a low voltage differential signaling driver according to other exemplary embodiments of the present invention.
Figure 8A:
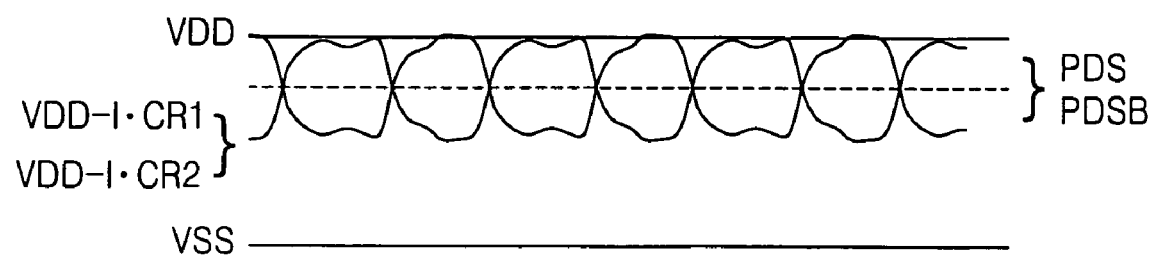
FIGS. 8A and 8B are diagrams illustrating the variations of the logic levels of signals output from a driving unit of FIG. 7 according to exemplary embodiments of the present invention.
Figure 8B:
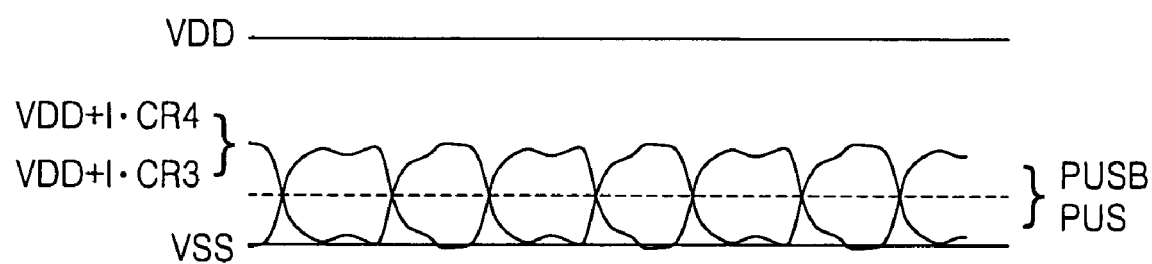

FIG. 7 is a circuit diagram of a low voltage differential signalling driver 700 according to another exemplary embodiment of the present invention, and FIGS. 8A and 8B are diagrams illustrating the levels of signals output from a driving unit 710, also referred to as a dual free driving unit 710, of FIG. 7.

Referring to FIG. 7, the low voltage differential signalling driver 700 includes the dual free driving unit 710, a transmission unit 720, and a reception unit 730.

The dual free driving unit 710 outputs a pull-down signal PDS having a first common mode voltage level and a pull-up signal PUS having a second common mode voltage level in response to a control signal RXEN, a clock signal CLK, and data DATA.

In some embodiments, the first common mode voltage level is a voltage level suitable for controlling an NMOS transistor at high speed, and the second common mode voltage level is a voltage level suitable for controlling a PMOS transistor at high speed. The first common mode voltage level is higher than the second common mode voltage level.

Specifically, the first common mode voltage level is suitable for controlling second and fourth transistors TR2 and TR4 in the transmission unit 720, and the second common mode voltage level is suitable for controlling first and third transistors TR1 and TR3 in the transmission unit 720.

The transmission unit 720 outputs differential signals from the outside via transmission lines TL and TLB in response to the pull-up signal PUS and the pull-down signal PDS output from the dual free driving unit 710. The reception unit 730 receives differential signals via the transmission lines TL and TLB. The structures and operations of the transmission unit 720 and the reception unit 730 can be the same as the structures and operations of the transmission unit TX1 and the reception unit RX1 of FIG. 5.

In some embodiments, the dual free driving unit 710 includes a first controller 740 and a second controller 760.

The first controller 740 controls the logic levels of the pull-down signal PDS and an inverted pull-down signal PDSB in accordance with a logic level of the data DATA in response to the control signal RXEN and the clock signal CLK. The second controller 760 controls the logic levels of the pull-up signal PUS and an inverted pull-up signal PUSB in accordance with the logic level of the data DATA in response to an inverted control signal RXENB and an inverted clock signal CLKB.

Since the data DATA input to the low voltage differential signalling driver 700 has a swing width equivalent to a CMOS level, it may serve as an obstacle to the operation of the low voltage differential signalling driver 700 at a high frequency. Accordingly, the dual free driving unit 710 converts the level of the data DATA to be compatible with the first and second common mode voltage levels suitable for controlling the first through fourth transistors TR1 through TR4 and then outputs the conversion results to the transmission unit 720.

The operation of the dual free driving unit 710 will now be described in further detail. The first controller 740 includes a pull-down signal generator 745 and an inverted pull-down signal generator 750.

The pull-down signal generator 745 generates a pull-down signal (PDS) whose logic level is opposite to the logic level of the data DATA in response to the control signal RXEN and the clock signal CLK. The pull-down signal generator 745 includes a first control resistor CR1, which is connected between a power supply voltage VDD and a first control node NC1, a first control transistor CTR1, which is connected between the first control node NC1 and a ground voltage VSS, and second and third control transistors CTR2 and CTR3, which are connected to each other in series between the first control node NC1 and the ground voltage VSS. The clock signal CLK and the data DATA are input to the controlling electrodes (e.g., gates) of the second and third control transistors CTR2 and CTR3, respectively.

The inverted pull-down signal generator 750 generates the inverted pull-down signal PDSB whose logic level is the same as the logic level of the data DATA in response to the control signal RXEN and the clock signal CLK. The inverted pull-down signal generator 750 includes a second control resistor CR2, which is connected between the power supply voltage VDD and a second control node NC2, a fourth control transistor CTR4, which is connected between the second control node NC2 and the ground voltage VSS, and fifth and sixth control transistors CTR5 and CTR6, which are connected to each other in series between the second control node NC2 and the ground voltage VSS. The clock signal CLK and the inverted data DATAB are input to the controlling electrodes of the fifth and sixth control transistors CTR5 and CTR6, respectively.

The second controller 760 includes a pull-up signal generator 765 and an inverted pull-up signal generator 770. The pull-up signal generator 765 generates the pull-up signal PUS whose logic level is the same as the logic level of the data DATA in response to the inverted control signal RXENB and the inverted clock signal CLKB.

The pull-up signal generator 765 includes first and second inverted control transistors CTRB1 and CTRB2, which are connected to each other in series between the power supply voltage VDD and a first inverted control node NCB1, a third inverted control transistor CTRB3, which is connected between the power supply voltage VDD and the first inverted control node NCB1, and a third control resistor CR3, which is connected between the first inverted control node NCB1 and the ground voltage VSS. The inverted data DATAB and the inverted clock signal CLKB are input to the controlling electrodes of the first and second inverted control transistors CTRB1 and CTRB2, respectively.

The inverted pull-up signal generator 770 generates an inverted pull-up signal PUSB whose logic level is opposite to the logic level of the data DATA in response to the inverted control signal RXENB and the inverted clock signal CLKB.

The inverted pull-up signal generator 770 includes fourth and fifth inverted control transistors CTRB4 and CTRB5, which are connected to each other in series between the power supply voltage VDD and a second inverted control node NCB2, a sixth inverted control transistor CTRB6, which is connected between the power supply voltage and the second inverted control node NCB2, and a fourth control resistor CR4, which is connected between the second inverted control node NCB2 and the ground voltage VSS. The data DATA and the inverted clock signal CLKB are input to the controlling electrodes of the fourth and fifth inverted control transistors CTRB4 and CTRB5, respectively, and the control signal RXENB is input to the controlling electrode of the sixth inverted control transistor CTRB6.

The data DATA is output to the outside when the clock signal CLK has a logic high level and the control signal RXEN has a logic low level. The first and second controllers 740 and 760 operate according to the logic level of the data DATA.

The operation of the first and second controllers 740 and 760 will now be described in further detail on the assumption that the data DATA has a logic low level. Since the control signal RXEN has a logic low level, the third inverted control transistor CTRB3 of the pull-up signal generator 765 is turned off, the first inverted control transistor CTRB1 is turned off in response to the inverted data DATAB, and the second inverted control transistor CTRB2 is turned on in response to the inverted clock signal CLKB.

Accordingly, the first inverted control node NCB1 is switched to a logic low level, and the first transistor TR1 of the transmission unit 720 is turned on in response to the pull-up signal PUS having a logic low level. The second inverted control node NCB2 is switched to a logic high level, and the third transistor TR3 of the transmission unit 720 is turned off. The third and fourth control resistors CR3 and CR4 have predetermined resistance values so that the voltage levels of the first and second inverted control nodes NCB1 and NCB2 can be uniformly maintained.

Since the control signal RXEN has a logic low level, the first transistor CTR1 of the pull-down signal generator 745 is turned off, the second control transistor CTR2 is turned on in response to the clock signal CLK, and the third control transistor CTR3 is turned off in response to the data DATA.

The first control node NC1 is switched to a logic high level, and the fourth transistor TR4 of the transmission unit 720 is turned on in response to the pull-down signal PDS having a logic high level. The second control node NC2 is switched to a logic low level, and the second transistor TR2 of the transmission unit 720 is turned off.

When the logic level of the data DATA is low, the same current path that is generated in the low voltage differential signalling driver 600 of FIG. 6 is generated in the low voltage differential signalling driver 700. However, the low voltage differential signalling driver 700 can achieve a higher operating speed than the low voltage differential signalling driver 600 of FIG. 6.

FIG. 8A illustrates variations of the logic levels of the pull-down signal PDS and the inverted pull-down signal PDSB. Referring to FIG. 8A, when the voltage level of the data DATA swings between the power supply voltage VDD and the ground voltage VSS, the voltage level of the pull-down signal PDS swings between the power supply voltage VDD and a voltage obtained by subtracting a voltage VDD−I·CR1 generated by the third control resistor CR3 from the power supply voltage VDD, and the voltage level of the inverted pull-down signal PDSB swings between the power supply voltage VDD and a voltage obtained by subtracting a voltage VDD−I·CR2 generated by the fourth control resistor CR4 from the power supply voltage VDD.

FIG. 8B illustrates the variations of the logic levels of the pull-up signal PUS and the inverted pull-up signal PUSB. Referring to FIG. 8B, when the voltage level of the data DATA swings between the power supply voltage VDD and the ground voltage VSS, the voltage level of the pull-up signal PUS swings between the ground voltage VSS and a voltage obtained by adding the ground voltage VSS to a voltage VDD+I·CR3 generated by the first control resistor CR1, and the voltage level of the inverted pull-up signal PUSB swings between the ground voltage VSS and a voltage obtained by adding the ground voltage VSS to a voltage VDD+I·CR4 generated by the second control resistor CR2.

In other words, the pull-up signal PUS, the pull-down signal PDS, the inverted pull-up signal, and the inverted pull-down signal PDSB applied to the first through fourth transistors TR1 through TR4 of the transmission unit 720 have a small swing width, thus enhancing the operating speed of the transmission unit 720. The low voltage differential signalling driver 700 can perform high frequency operations using the dual free driving unit 710.

The operation of the dual free driving unit 710 when the data DATA has a logic high level will be understood by one of ordinary skill in the art, and thus its detailed description will be skipped.

Data communication systems according to exemplary embodiments of the present invention will now be described in detail. These data communication systems can include first and second low voltage differential signalling drivers which are connected to each other by transmission lines and receive data from and transmit data to each other via the transmission lines.

The first low voltage differential signalling driver includes a dual free driving unit which is configured to reduce signal reflections by using a termination resistance which is the same as a load resistance of the second differential signalling driver, when transmitting data to the second low voltage differential signalling driver and is further configured to enhance the speed of transmitting the data to the second low voltage differential signalling driver by controlling the logic level of the data. The second low voltage differential signalling driver can have the same structure as the first low voltage differential signalling driver.

The first low voltage differential signalling driver can have the same structure as, and can serve the same functions as, the first low voltage differential signalling driver 400 of FIG. 4. The second low voltage differential signalling driver can have the same structure as, and can serve the same functions as, the second low voltage differential signalling driver 410 of FIG. 4. Thus, detailed descriptions of the operation and structure of the data communication system need not be provided.

Data communication methods of a low voltage differential signalling driver according to exemplary embodiments of the present invention will now be described in detail. The low voltage differential signalling driver includes first and second branches and a control switch for controlling the reception of differential signals and transmits and receives the differential signals via transmission lines in response to data.

These data communication methods can include: determining whether to receive or transmit a differential signal; turning off the control switch if it is determined to transmit a differential signal; selectively turning on transistors included in the first and second branches according to the voltage level of data input to the low voltage differential signalling driver; and outputting the differential signal to the transmission lines using a current path formed by the transistors that are turned on.

These data communication methods can be related to the operation of the low voltage differential signalling driver of FIG. 4 or 7. The operation of the low voltage differential signalling driver of FIG. 4 or 7 has been described above, and thus, its detailed description need not be repeated.

As described above, low voltage differential signalling drivers according to exemplary embodiments of the present invention can reduce or minimize signal reflections using termination resistances when transmitting data and can use some of the termination resistances exclusively provided for receiving data by controlling a control switch when receiving data. In addition, since a low voltage differential signalling driver according to exemplary embodiments of the present invention can be a half-duplex structure, it can reduce the number of pins used for transmitting and receiving data by using the same pins to both transmit and receive data and can achieve high operating speed while consuming less power.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A low voltage differential signaling driver comprising:
   first and second current sources;
   a first branch, which comprises at least two transistors and at least two resistors therebetween that are all connected in series between the first and second current sources to define a first node between adjacent resistors that is configured to transmit and receive a first signal;
   a second branch, which comprises at least two transistors and at least two resistors therebetween that also are all connected in series between the first and second current sources to define a second node between adjacent resistors that is also configured to transmit and receive a second signal; and
   a control switch connected between the first branch and the second branch, which controls the transmission and reception of the first and second signals,
   wherein the first signal and the second signal are differential signals;
   wherein the first branch comprises:
      a first transistor which has a first controlled electrode connected to the first current source and has a controlling electrode to which data is input;
      a first resistor which has one end connected to a second controlled electrode of the first transistor and has the other end connected to the first node;
      a second transistor which has a first controlled electrode connected to the second current source and has a controlling electrode to which the data is input; and
      a second resistor which has one end connected to the first node and has the other end connected to a second controlled electrode of the second transistor;
   wherein the second branch comprises:
      a third transistor which has a first controlled electrode connected to the first current source and has a controlling electrode to which inverted data is input, the inverted data having a logic level opposite to the logic level of the data;
      a third resistor which has one end connected to a second controlled electrode of the third transistor and has the other end connected to the second node;
      a fourth transistor which has a first controlled electrode connected to the second current source and has a controlling electrode to which the inverted data is input; and
      a fourth resistor which has one end connected to the second node and has the other end connected to a second controlled electrode of the fourth transistor; and
   wherein the control switch is connected between a third node and a fourth node, the third node connecting the first transistor and the first resistor and the fourth node connecting the third transistor and the third resistor.

2. The low voltage differential signaling driver of claim 1, wherein if the data has a second logic level, the first and fourth transistors are turned on, and the second and third transistors are turned off, and if the data has a first logic level, the second and third transistors are turned on, and the first and fourth transistors are turned off.

3. The low voltage differential signaling driver of claim 2, wherein the first and second nodes are connected to first and second transmission lines having load resistance connected thereto and wherein if the data has the second logic level, a result of summing up a total resistance of a current path formed between the first current source and the first node and a total resistance of a current path formed between the second node and the second current source is equal to the load resistance.

4. The low voltage differential signaling driver of claim 2, wherein the first and second nodes are connected to first and second transmission lines having load resistance connected thereto and wherein if the data has the first logic level, a result of summing up a total resistance of a current path formed between the first current source and the second node and a total resistance of a current path formed between the first node and the second current source is equal to the load resistance.

5. The low voltage differential signaling driver of claim 1, wherein the first and second nodes are connected to first and second transmission lines having load resistance connected thereto and wherein if the load resistance is 2 Z, each of the first through fourth resistors has a resistance of 0.9 Z.

6. The low voltage differential signaling driver of claim 1, wherein if differential signals are input to the low voltage differential signaling driver via the first and second nodes, all of the first through fourth transistors are turned off, and the control switch is turned on.

7. A low voltage differential signaling driver comprising:
a driving unit which is configured to output a pull-down signal having a first common mode voltage level and a pull-up signal having a second common mode voltage level in response to a control signal, a clock signal, and data;
a transmission unit which is configured to output an output differential signal via transmission lines in response to the pull-up signal and the pull-down signal output from the driving unit; and
a reception unit which is configured to receive an input differential signal via the transmission lines,
wherein the transmission unit comprises:
first and second current sources;
a first branch, which comprises at least two transistors and at least two resistors therebetween that are all connected in series between the first and second current sources to define a first node between adjacent resistors that is configured to transmit and receive a first signal;
a second branch, which comprises at least two transistors and at least two resistors therebetween that also are all connected in series between the first and second current sources to define a second node between adjacent resistors that is also configured to transmit and receive a second signal; and
a control switch connected between the first branch and the second branch which controls a transmission and reception of the first and second signals,
wherein the first signal and the second signal are differential signals and
wherein the driving unit comprises:
a first controller which is configured to control the logic levels of the pull-down signal and an inverted pull-down signal based on a logic level of the data in response to the control signal and the clock signal; and a second controller which is configured to control the logic levels of the pull-up signal and an inverted pull-up signal based on the logic level of the data in response to an inverted control signal and an inverted clock signal.

8. The low voltage differential signaling driver of claim 7, wherein the first common mode voltage level is a voltage level suitable for controlling an NMOS transistor at high speed, the second common mode voltage level is a voltage level suitable for controlling a PMOS transistor at high speed, and the first common mode voltage level is higher than the second common mode voltage level.

9. The low voltage differential signaling driver of claim 8, wherein the first branch comprises:
a first transistor which has a first controlled electrode connected to the first current source and has a controlling electrode to which data is input;
a first resistor which has one end connected to a second controlled electrode of the first transistor and has the other end connected to the first node;
a second transistor which has a first controlled electrode connected to the second current source and has a controlling electrode to which the data is input; and
a second resistor which has one end connected to the first node and has the other end connected to a second controlled electrode of the second transistor, and wherein the second branch further comprises:
a third transistor which has a first controlled electrode connected to the first current source and has a controlling electrode to which inverted data is input, the inverted data having a logic level opposite to the logic level of the data;
a third resistor which has one end connected to a second controlled electrode of the third transistor and has the other end connected to the second node;
a fourth transistor which has a first controlled electrode connected to the second current source and has a controlling electrode to which the inverted data is input; and
a fourth resistor which has one end connected to the second node and has the other end connected to a second controlled electrode of the fourth transistor.

10. The low voltage differential signaling driver of claim 9, wherein if the data has a second logic level, the first and fourth transistors are turned on, and the second and third transistors are turned off, and if the data has a first logic level, the second and third transistors are turned on, and the first and fourth transistors are turned off.

11. The low voltage differential signaling driver of claim 9, wherein if the data has the second logic level, a result of summing up a total resistance of a current path formed between the first current source and the first node and a total resistance of a current path formed between the second node and the second current source is equal to a load resistance that is connected to the transmission lines.

12. The low voltage differential signaling driver of claim 9, wherein if the data has the first logic level, a result of summing up a total resistance of a current path formed between the first current source and the second node and a total resistance of a current path formed between the first node and the second current source is equal to a load resistance that is connected to the transmission lines.

13. The low voltage differential signaling driver of claim 9, wherein if a load resistance that is connected to the transmission lines is 2 Z, each of the first through fourth resistors has a resistance of 0.9 Z.

14. The low voltage differential signaling driver of claim 9 further comprising:

a control switch which is provided between a third node and a fourth node, the third node connecting the first transistor and the first resistor and the fourth node connecting the third transistor and the third resistor.

15. The low voltage differential signaling driver of claim 14, wherein if differential signals are input to the low voltage differential signaling driver via the transmission lines, all of the first through fourth transistors are turned off, and the control switch is turned on.

16. The low voltage differential signaling driver of claim 7, wherein the first controller comprises:
a pull-down signal generator which is configured to generate the pull-down signal whose logic level is opposite to the logic level of the data in response to the control signal and the clock signal; and
an inverted pull-down signal generator which is configured to generate the inverted pull-down signal whose logic level is identical to the logic level of the data in response to the control signal and the clock signal.

17. The low voltage differential signaling driver of claim 16, wherein the pull-down signal generator comprises:
a first control resistor which is connected between a power supply voltage and a first control node;
a first control transistor, the controlled electrodes of which are connected between the first control node and a ground voltage and the controlling electrode of which is connected to the control signal; and
second and third control transistors, the controlled electrodes of which are connected to each other in series between the first control node and the ground voltage and the controlling electrodes of which are connected to the clock signal and the data, respectively, and
the inverted pull-down signal generator comprising:
a second control resistor which is connected between the power supply voltage and a second control node;
a fourth control transistor, the controlled electrodes of which are which is connected between the second control node and the ground voltage and the controlling electrode of which is connected to the control signal; and
fifth and sixth control transistors, the controlled electrodes of which are connected to each other in series between the second control node and the ground voltage and the controlling electrodes of which are connected to the clock signal and inverted data, respectively.

18. The low voltage differential signaling driver of claim 16, wherein the second controller comprises:
a pull-up signal generator which is configured to generate the pull-up signal whose logic level is identical to the logic level of the data in response to the inverted control signal and the inverted clock signal; and
an inverted pull-up signal generator which is configured to generate the inverted pull-up signal whose logic level is opposite to the logic level of the data in response to the inverted control signal and the inverted clock signal.

19. The low voltage differential signaling driver of claim 18, wherein the pull-up signal generator comprises:
first and second inverted control transistors, the controlled electrodes of which are connected in series between the power supply voltage and a first inverted control node and the controlling electrodes of which are connected to the inverted data and the inverted clock signal, respectively;
a third inverted control transistor, the controlled electrodes of which are connected between the power supply voltage and the first inverted control node and the controlling electrode of which is connected to the inverted control signal; and
a third control resistor which is connected between the first inverted control node and the ground voltage, and wherein
the inverted pull-up signal generator comprises:
fourth and fifth inverted control transistors, the controlled electrodes of which are connected in series between the power supply voltage and a second inverted control node and the controlling electrodes of which are connected to the data and the inverted clock signal, respectively;
a sixth inverted control transistor, the controlled electrodes of which are connected between the power supply voltage and the second inverted control node and the controlling electrode of which is connected to the inverted control signal; and
a fourth control resistor which is connected between the second inverted control node and the ground voltage.

20. A data communication system comprising:
first and second low voltage differential signaling drivers which are connected to each other via transmission lines and transmit data to or receive data from each other via the transmission lines,
wherein the first low voltage differential signaling driver comprises:
a control switch, which controls the transmission and reception of the data; and
a driving unit, which is configured to reduce signal reflections using termination resistance which is same as load resistance of the second low voltage differential signaling driver and is configured to enhance the speed of transmitting data by controlling the logic level of the data in response to the control switch, and the second low voltage differential signaling driver has same structure as the first low voltage differential signaling driver;
wherein the first low voltage differential signaling driver comprises:
the driving unit which is configured to output a pull-down signal having a first common mode voltage level and a pull-up signal having a second common mode voltage level in response to a control signal, a clock signal, and data;
a transmission unit which is configured to output an output differential signal via the transmission lines in response to the pull-up signal and the pull-down signal output from the driving unit; and
a reception unit which is configured to receive an input differential signal from outside of the low voltage differential signaling driver via the transmission lines,
wherein the transmission unit comprises:
first and second current sources;
a first branch, which comprises at least two transistors and at least two resistors therebetween that are all connected in series between the first and second current sources to define a first node between adjacent resistors that is configured to transmit and receive differential signals; and
a second branch, which comprises at least two transistors and at least two resistors therebetween that also are all connected in series between the first and second current sources to define a second node between adjacent resistors that is also configured to transmit and receive differential signals; and
wherein the driving unit comprises:
a first controller which is configured to control the logic levels of the pull-down signal and an inverted pull-down signal based on the logic level of the data in response to the control signal and the clock signal; and a second controller which is configured to control the logic levels of the pull-up signal and an inverted pull-up signal based on the logic level of the data in response to an inverted control signal and an inverted clock signal.

21. The data communication system of claim 20, wherein the first common mode voltage level is a voltage level suitable for controlling an NMOS transistor at high speed, the second common mode voltage level is a voltage level suitable for controlling a PMOS transistor at high speed, and the first common mode voltage level is higher than the second common mode voltage level.

22. The low voltage differential signaling driver of claim 20, wherein the first controller comprises:
a pull-down signal generator which is configured to generate the pull-down signal whose logic level is opposite to the logic level of the data in response to the control signal and the clock signal; and
an inverted pull-down signal generator which is configured to generate the inverted pull-down signal whose logic level is identical to the logic level of the data in response to the control signal and the clock signal.

23. The data communication system of claim 22, wherein the pull-down signal generator comprises:
a first control resistor which is connected between a power supply voltage and a first control node;
a first control transistor, the controlled electrodes of which are connected between the first control node and a ground voltage and the controlling electrode of which is connected to the control signal; and
second and third control transistors, the controlled electrodes of which are connected to each other in series between the first control node and the ground voltage and the controlling electrodes of which are connected to the clock signal and the data, respectively, and
the inverted pull-down signal generator comprising:
a second control resistor which is connected between the power supply voltage and a second control node;
a fourth control transistor, the controlled electrodes of which are connected between the second control node and the ground voltage and the controlling electrode of which is connected to the control signal; and
fifth and sixth control transistors, the controlled electrodes of which are connected to each other in series between the second control node and the ground voltage and the controlling electrodes of which are connected to the clock signal and inverted data, respectively.

24. The data communication system of claim 20, wherein the second controller comprises:
a pull-up signal generator which is configured to generate the pull-up signal whose logic level is identical to the logic level of the data in response to the inverted control signal and the inverted clock signal; and
an inverted pull-up signal generator which is configured to generate the inverted pull-up signal whose logic level is opposite to the logic level of the data in response to the inverted control signal and the inverted clock signal.

25. The data communication system of claim 24, wherein the pull-up signal generator comprises:
first and second inverted control transistors, the controlled electrodes of which are connected in series between the power supply voltage and a first inverted control node and the controlling electrodes of which are connected to the inverted data and the inverted clock signal, respectively;
a third inverted control transistor, the controlled electrodes of which are connected between the power supply voltage and the first inverted control node and the controlling electrode of which is connected to the inverted control signal; and
a third control resistor which is connected between the first inverted control node and the ground voltage, and wherein
the inverted pull-up signal generator comprises:
fourth and fifth inverted control transistors the controlled electrodes of which are connected in series between the power supply voltage and a second inverted control node and the controlling electrodes of which are connected to the data and the inverted clock signal, respectively;
a sixth inverted control transistor, the controlled electrodes of which are connected between the power supply voltage and the second inverted control node and the controlling electrode of which is connected to the inverted control signal; and
a fourth control resistor which is connected between the second inverted control node and the ground voltage.

26. A data communication method for a low voltage differential signaling driver which comprises first and second branches and a control switch which controls the reception of a differential signal and transmits and receives the differential signal via transmission lines in response to data, the data communication method comprising:
determining whether to transmit or receive a differential signal;
turning off the control switch if it is determined to transmit the differential signal;
selectively turning on transistors included in the first and second branches according to the voltage level of data input to the low voltage differential signaling driver;
outputting the differential signal to the transmission lines using a current path formed by the transistors that are turned on;
turning on the control switch if it is determined to receive the differential signal; and
receiving the differential signal via the transmission lines.

27. The data communication method of claim 26, wherein the first branch comprises:
at least two transistors and at least two resistors therebetween that are all connected in series between first and second current sources, to define a first node between adjacent resistors that is configured to be connected to one of the transmission lines; and
wherein the second branch comprises at least two transistors and at least two resistors therebetween that are all connected in series between the first and second current sources, to define a second node between adjacent resistors that is configured to be connected to another of the transmission lines.

28. The data communication method of claim 27, wherein if the data has the second logic level, a result of summing up a total resistance of a current path formed between the first current source and the first node and a total resistance of a current path formed between the second node and the second current source is equal to a load resistance which is connected to the transmission lines.

29. The data communication method of claim 27, wherein if the data has the first logic level, a result of summing up a total resistance of a current path formed between the first current source and the second node and a total resistance of a current path formed between the first node and the second current source is equal to a load resistance which is connected to the transmission lines.

30. The data communication method of claim 27, wherein if the control switch is turned on, all of the transistors included in the first and second branches are turned off.

31. The data communication method of claim 27, wherein the selectively turning on of the transistors included in the first and second branches according to the voltage level of the input data, comprises:
controlling the voltage level of the input data; and applying the input data whose voltage level has been controlled to the transistors included in the first and second branches.

32. The data communication method of claim 31, wherein in the controlling of the voltage level of the input data, the voltage level of the input data is controlled based on a common mode voltage level of the transistors included in the first and second branches.

* * * * *